Patented June 15, 1943

2,322,007

UNITED STATES PATENT OFFICE 2,322,007

MOTOR FUEL

Herbert G. M. Fischer, Westfield, N. J., assignor to Standard Oil Development Company, a corporation of Delaware No Drawing. Application September 27, 1939, Serial No. 296,809

5 Claims. (Cl. 44—58)

The present invention relates to the production of improved quality petroleum products from aged petroleum fractions which are not satisfactory for commercial consumption. The invention is particularly concerned with a method for conditioning unstable motor fuels such as gasolines, aviation fuels, safety fuels, Diesel fuels, and the like which have deteriorated in quality due to gum formation so that they are totally unsuited for use in internal combustion engines. In accordance with the present invention, petroleum products adapted for consumption in internal combustion engines and containing a prohibitive amount of gum are treated in a manner to render the gum innocuous and thus permit the utilization of said petroleum products with efficient results. This is accomplished by conditioning the gasolines containing a prohibitive amount of gum with lecithin.

In the manufacture of petroleum products suitable for consumption in internal combustion engines, it is known that chemical reactions occur, resulting in the formation of color bodies and in the formation of gummy substances. These gummy substances, upon injection of the fuel into an internal combustion engine, form a hard residue polymer which is insoluble in gasoline and thus causes mediocre engine performance by depositing on the walls of the inlet manifold and on the valves causing sticking of the same. In order to prevent the formation of color bodies and gummy resinous materials in motor fuels and the like, it is known to add numerous inhibiting substances which widely vary in chemical structure. Inhibitors of this character are, for example, cresols, various amino compounds, and the like. It has also been suggested that lecithin be added to gasolines which tend to form gum in order to inhibit the same against the formation of color bodies and gummy substances. These materials are all added to gasolines which are substantially free of gum in order to inhibit the gasolines against subsequent gum formation.

In the marketing of gasoline, it sometimes occurs that a quantity of the fuel is stored at some isolated location for long periods of time. Under these conditions a motor fuel may develop sufficient gum to make it unsuitable for use. It then is necessary to return the fuel to the refinery for reprocessing.

I have now discovered a process of conditioning gum-containing gasolines which render them entirely suitable for subsequent use in internal combustion engines thus avoiding the large expense involved in reprocessing such products.

In accordance with my invention a sufficient quantity of lecithin is added to the gum-containing gasoline to retain the gum in a liquid state and thus prevent it from hardening and depositing on the manifold and on the valves. The added lecithin will increase the total gum content of said gasoline as determined by the A. S. T. M. method. This increase, however, is not actual gum but is caused by the non-volatile nature of the lecithin added. When the resulting fuel is vaporized in a carburetor, the nature of the gummy substances is entirely different in character from the nature of the gummy substances prior to the addition of the lecithin. The gummy substance as conditioned by the use of lecithin is of a fluid character, thus permitting the air fuel mixture passing through the manifold to carry the liquefied gum into the combustion chamber where it will be burned without leaving any deposits.

It has been established by a large amount of experimental work that pre-formed gum, such as that determined by the A. S. T. M. test designated D–381–36, to the extent of about 10 mgs. to 15 mgs. per 100 ccs. of fuel can be tolerated by motors for short periods of time without an undue amount of difficulty. If, however, the motor is continuously operated on such a fuel, the accumulative effect of hard gum deposits will gradually cause a prohibitive amount of valve sticking, rendering the engine unfit for satisfactory and economical operation. If the gum content is in the order of 40 mgs. to 50 mgs. per 100 ccs. prohibitive difficulties are experienced over even shorter periods.

I am aware that a large number of inhibitors have been proposed to prevent the formation of gum in gasoline on storage, one of which is lecithin, both on leaded and unleaded gasolines. It is not the object of this invention to so treat a gum-free gasoline as to prevent the formation of gum, but rather to recondition a gum-containing gasoline which by long storage or for other reasons, such as lengthy exposure to sunlight may have become unstable so that relatively large amounts of gum have been formed. It is the object of this invention to modify the physical properties of the gum material in such a manner as to make it innocuous in a motor thus eliminating the expensive and uneconomical step of returning gum-containing gasolines to the refinery for reprocessing and the like. It is the object of this invention to condition the gum-containing gasoline with lecithin in a manner wherein the gum content is increased as determined by the above described A. S. T. M. method. By conditioning the gum in the fuel in this manner an unexpected result is secured whereby the entire gum content of the gasoline is rendered harmless and the fuel made entirely acceptable. By adding lecithin to a gum-containing gasoline which would otherwise upon being vaporized cause prohibitive engine difficulty, the gummy material is so conditioned that it will not be deposited on the manifold or valves of the engine, but will pass freely into the cylinder and there be burned without causing engine difficulties. Apparently the mechanism involved is that the added compound reacts with or solubilizes the gummy material.

The amount of lecithin added will depend upon the particular characteristics of the gum-containing gasoline and the amount of gum in said gasoline, as well as upon the character of said gum. However, in general, the amount of lecithin added should be in the range from about .01% to .2%. The lecithin may be added to condition any gasoline containing gum. However, the process is applicable in the treatment of gasolines containing quantities of gum which makes their use prohibitive. Thus, the invention is particularly applicable in the treatment of gasolines containing more than 10 mgs., preferably more than 20 mgs. of gum per 100 ccs. of naphtha as measured by the A. S. T. M. test D-381-36. The invention is particularly applicable in the treatment of gasolines containing more than 50 mgs. of gum per 100 ccs. of naphtha as determined by the A. S. T. M. test.

In order to further illustrate the invention, the following examples are given which should not be construed as limiting the same in any manner whatsoever:

Example 1

An aged cracked pressure distillate boiling in the motor fuel boiling range had a gum content of 74 mm. per 100 ccs. of oil. Various amounts of lecithin were added to the oil and the gum content and the character of the gum determined. The results of these tests were as follows:

|  | Gum containing mg. per 100 cc. A. S. T. M. method | Nature residue |
|---|---|---|
| Aged distillate | 74 | Brittle, non-fluid. |
| Aged distillate+0.05% lecithin | 125 | Do. |
| Aged distillate+0.2% lecithin | 191 | Viscous, fluid. |

Example 2

A blend comprising an equal volume of the pressure distillate of Example 1 and an equal volume of an aged finished distillate had a gum content of 43. Various percentages of lecithin were added to the blend with the following results:

|  | Gum containing mg. per 100 cc. A. S. T. M. method | Nature residue |
|---|---|---|
| Aged distillate | 43 | Brittle, non-fluid. |
| Aged distillate+0.05% lecithin | 82 | Do. |
| Aged distillate+0.2% lecithin | 147 | Viscous, fluid. |

Example 3

A cracked gasoline having a gum content of 16 as determined by the A. S. T. M. method was treated with 0.05 % lecithin. The results were as follows:

|  | Gum containing mg. per 100 cc. A. S. T. M. method | Nature residue |
|---|---|---|
| Aged cracked gasoline | 16 | Hard, non-fluid. |
| Aged cracked gasoline+0.05% lecithin | 44 | Soft, fluid. |

The process of the present invention is not to be limited by any theory or mode of operation, but only in and by the following claims in which it is desired to claim all novelty insofar as the prior art permits.

I claim:

1. Process for conditioning preformed gum-containing gasoline comprising adding to said gum-containing gasoline a quantity of lecithin sufficient to render the preformed gum fluid upon evaporation of the gasoline.

2. Process for conditioning a preformed gum-containing gasoline which is unsatisfactory for use in internal combustion engines comprising conditioning said preformed gum-containing gasoline by adding thereto quantity of lecithin sufficient to render the preformed gum fluid upon evaporation of the gasoline, whereby said preformed gum-containing gasoline is rendered satisfactory for use in internal combustion engines.

3. Process for reclaiming a satisfactory motor fuel from a motor fuel containing a prohibitive amount of non-fluid preformed gum in the range of above about 10 mg. of gum per 100 cc. of fuel as determined by the A. S. T. M. method, comprising adding to said motor fuel from 0.05 to 0.2% of lecithin whereby said preformed gum is rendered fluid.

4. Process in accordance with claim 3 in which said motor fuel contains at least 50 mg. of non-fluid preformed gum as determined by the A. S. T. M. method.

5. Process for the manufacture of high quality motor fuels from motor fuels having a preformed gum content which renders their use in internal combustion engines prohibitive comprising adding to said motor fuels lecithin whereby said gum after evaporation of the motor fuel is converted from a non-fluid to a fluid gum.

HERBERT G. M. FISCHER.